United States Patent
Hwang et al.

(10) Patent No.: US 6,449,594 B1
(45) Date of Patent: Sep. 10, 2002

(54) METHOD OF MODEL ADAPTATION FOR NOISY SPEECH RECOGNITION BY TRANSFORMATION BETWEEN CEPSTRAL AND LINEAR SPECTRAL DOMAINS

(75) Inventors: Tai-Hwei Hwang, Yunlin Hsien; Hsiao-Chuan Wang, Hsinchu, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 224 days.

(21) Appl. No.: 09/598,297

(22) Filed: Jun. 21, 2000

(30) Foreign Application Priority Data

Apr. 7, 2000 (TW) ........................ 89106378 A

(51) Int. Cl.[7] .................... G10L 15/20; G10L 15/06; G10L 15/28
(52) U.S. Cl. .................... 704/233; 704/231; 704/255
(58) Field of Search ................... 704/233, 256, 704/230–232, 255

(56) References Cited

U.S. PATENT DOCUMENTS 5,721,808 A * 2/1998 Minami et al. ............. 704/233
6,188,982 B1 * 2/2001 Chiang ...................... 704/233

OTHER PUBLICATIONS

Afify et al ("A General Joint Additive And Convolutive Bias Compensation Approach Applied To Noisy Lombard Speech Recognition", IEEE Transactions on Speech and Audio Processing, pp. 524–538, Nov. 1998).*

Nakamura et al ("Noise And Room Acoustics Distorted Speech Recognition By HMM Composition", IEEE International Conference on Acoustics, Speech, and Signal Processing, pp. 69–72 vol. 1, May 1996.)*

Openshaw et al ("On The Limitations Of Cepstral Features In Noise", IEEE International Conference on Acoustics, Speech, an Signal Processing pp. II/49–11/52 vol. 2, Apr. 1994).*

"Speech Recognition in Adverse Environments"; B.H. Juang; Computer Speech and Language (1991) 5, 275–294.

"Cepstral Parameter Compensation for HMM Recognition in Noise"; M.J.F. Gales and S.J. Young; Speech Communication 12 (1993) 231–239.

"Fast Parallel Model Combination Noise Adaptation Processing"; Yasuhiro Komori, Tetsuo Kosaka, Hiroki Yamamoto and Masayuki Yamada; 1523 and 1526.

"Noise–Adaptive Hidden Markov Models Based on Wiener Filters"; S.V. Vaseghi and B.P. Milner; pp. 1023 and 1026.

* cited by examiner

*Primary Examiner*—Richemond Dorvil
*Assistant Examiner*—Daniel A. Nolan
(74) *Attorney, Agent, or Firm*—Bacon & Thomas

(57) ABSTRACT

A method of model adaptation for noisy speech recognition determines the cepstral mean vector and covariance matrix of adapted noisy speech from the cepstral mean vectors and covariance matrices of speech and noise. The cepstral mean vectors of noise and speech are first transferred into the linear spectral domain, respectively. The linear spectral mean vectors of noise and speech are then combined to obtain a linear spectral mean vector of noisy speech. Next, the linear spectral mean vector of noisy speech is transferred from the linear spectral domain into the cepstral domain, so as to determine the cepstral mean vector of adapted noisy speech. Further, the cepstral covariance matrices of speech and noise are multiplied by a first and a second scaling factor, respectively, and the multiplied cepstral covariance matrices are combined together, so as to determine the cepstral covariance matrix of adapted noisy speech.

11 Claims, 3 Drawing Sheets

METHOD OF MODEL ADAPTATION FOR NOISY SPEECH RECOGNITION BY TRANSFORMATION BETWEEN CEPSTRAL AND LINEAR SPECTRAL DOMAINS

BACKGROUND OF THE INVENTION

1. Field of the Invention

The present invention relates to the field of speech recognition and, more particularly, to a method of model adaptation for noisy speech recognition.

2. Description of Related Art

In a conventional automatic speech recognition system, as shown in FIG. 2, speech signals of time domain, denoted by $\{x_t\}$, are entered for executing an end point detection and feature extraction process to determine the speech and background noise, so as to extract the desired speech signals. Then, the extracted speech signals are applied for executing a pattern matching process with respect to speech reference models 21 to produce possible results, and, finally, a decision rule is applied to the possible results so as to obtain the recognition results, as denoted by $\{W_n\}$.

Generally, the speech reference models 21 are preferred to be the well-known Hidden Markov Models (HMMs). Such statistic models represent the relevant feature distribution and time-variable transformation characteristics of the speech spectrum. In order to have reliable statistic models, it is required to record speech data from a great number of people before performing the process of training the model parameters. In such a speech data collecting process, the recording of speech data is generally performed in an ideal quiet environment, so as to obtain statistic models indicative of a noiseless environment. However, in practical application, it is impossible to have a completely noiseless environment. On the contrary, noise exists everywhere and anytime in the environment. Furthermore, the types of noise and intensity thereof are not predictable. As such, noise is likely to add an extra spectral component in the original clean speech signals, which results in degrading the speech recognition rate significantly.

As well known to those skilled in the art, a better speech recognition rate can be achieved if the environmental factors of training speech data and speech to be recognized are matched, and a description of such can be found in Juang, B. H. "Speech recognition in adverse environments", Computer Speech and Language 5, pp. 275–294, 1991, and is hereby incorporated herein by reference. Therefore, it is possible to improve the recognition rate of noisy speech by using the speech data with the same noise as that of the noisy speech to train the statistic models. Although it is theoretically possible to train model parameters again when the environmental noise is changed, it can hardly be achieved in practical applications. One major reason is that the required speech database is relatively large, and thus the cost of a speech recognizer with such a database is too high. Furthermore, the computation amount is large and the time required to train parameters is long, so that the requirement of dynamical adaptation based on the change of the environment is difficult to achieved. Therefore, efforts are devoted to having noisy speech statistic models without involving a repetitive training process. As known, in the HMMs, the speech probability density is the parameter that is most susceptible to be influenced by external noise. Therefore, the speech recognition rate can be significantly improved if the speech probability density function is adjusted to match with the noise condition of the test utterance. However, the speech density is generally expressed in the cepstral domain, while the effect of noise is of an accumulation in the linear spectral domain. As a result, it is theoretically impossible to adjust the speech probability density function directly in the cepstral domain.

To eliminate the aforementioned problem, a Parallel Model Combination (PMC) method is proposed to combine the statistical data of speech and noise in the linear spectral domain by means of transformation between cepstral domain and linear spectral domain, thereby obtaining the cepstral means and variances of the noisy speech. The description of such a PMC method can be found in Gales, M. J. F. & Young, S. J. "Cepstral parameter compensation for HMM recognition in noise", Speech Communication 12, pp. 231–239, 1993, which is hereby incorporated by reference into this patent application. Accordingly, speech models can be adjusted based on the change of the environmental noise by detecting the background noise in the speech inactive period and determining the statistical data of noise.

FIG. 3 shows an automatic speech recognition system utilizing such a PMC method. As shown, speech signals, denoted by $\{x_t\}$, are entered to execute an end point detection and feature extraction process for determining the background noise and obtaining extracted speech signals. The background noise is provided for noise model estimation. The estimation results and the reference speech models 21 are applied together for PMC adaptation to obtain adapted speech models 31 that is varied according to the change of the environmental noise. Then, the extracted speech signals are applied for executing a pattern matching process with respect to the adapted speech models 21 to produce possible results, and, finally, determine the recognition results $\{W_n\}$.

In executing the above PMC method, for simplicity of expression, it is assumed that the speech probability density function is represented by a Gaussian function $f(x|\mu^c, \Sigma^c)$, where x represents a cepstral observation vector, $\mu^c$ represents a cepstral mean vector, and $\Sigma^c$ represents a cepstral covariance matrix. The method first transforms the $\mu^c$ and $\Sigma^c$ of the speech model from the cepstral domain to the log-spectral domain by performing inverse discrete cosine transform (IDCT) operations as follows:

$$\mu^l = C^{-1}\mu^c \text{ and}$$

$$\Sigma^l = C^{-1}\Sigma^c(C^{-1})^T,$$

where the superscript l indicates the parameter in the log-spectral domain, $C^{-1}$ is a matrix for IDCT, and the superscript T indicates the transposed matrix. Each component of the mean vector and covariance matrix can be obtained as follows:

$$\mu_i = \exp(\mu_i^l + \sigma_{ii}^l/2) \text{ and}$$

$$\sigma_{ij} = \mu_i\mu_j[\exp(\sigma_{ij}^l) - 1].$$

After the mean vectors and covariance matrices of speech and noise are respectively obtained, the corresponding statistic of noisy speech can be obtained by performing parameter combination operations as follows:

$$\hat{\mu}_i = g\mu_i + \mu_i \text{ and}$$

$$\hat{\sigma}_{ij} = g^2\sigma_{ij} + \sigma_{ij},$$

where g is a scaling factor that provides the power matching between the training data and the test utterance, $\mu_i$ is the ith noise component, and $\sigma_{ij}$ is the ijth variance component. Thereafter, the log-spectral mean vector and variance of the noisy speech can be obtained by taking the inverse transformation as follows:

$$\hat{\mu}_i^l = \log(\hat{\mu}_i) - 0.5\hat{\sigma}_{ii}^l \text{ and}$$

$$\hat{\sigma}_{ij}^l = \log\left(\frac{\hat{\sigma}_{ij}}{\hat{\mu}_i \hat{\mu}_j} + 1\right).$$

Finally, the cepstral mean vector and covariance matrix of noisy speech can be obtained by taking the discrete cosine transform (DCT) as follows:

$$\hat{\mu}^c = C\hat{\mu}^l \text{ and}$$

$$\hat{\Sigma}^c = C\hat{\Sigma}^l C^T.$$

From the aforementioned process, it is known that the noisy speech models can be obtained in using the PMC method by estimating the statistic of the background noise in the speech inactive period, so as to decrease the computation amount. However, in practice, the actual computation amount to adjust all the probability density functions in using the PMC method is still relatively huge, especially when the number of models is large. In order to effectively reduce the time for model adaptation, an improved PMC method is proposed to reduce the number of PMC processing times by introducing the distribution composition with the spatial relation of distributions. The description of such an improved PMC method can be found in Komori, Y, Kosaka, T., Yamamoto, H., & Yamada, M. "Fast parallel model combination noise adaptation processing", Proceedings of Eurospeech 97, pp. 1523–1526, 1997, which is hereby incorporated herein for reference. Furthermore, a published document, Vaseghi, S. V. & Milner, B. P. Noise-Adaptive hidden Markov models based on Wiener filters Proceedings of Eurospeech 93, pp. 1023–1026. 1993, incorporated herein for reference, is provided to reduce the computation amount of the PMC method by simply adapting the mean vectors without adjusting the variances. These methods use fewer adaptation parameters than those of the original PMC method, and thus the recognition rate for noisy speech is not satisfactory. Therefore, it is desirable to provide an improved speech recognition method to mitigate and/or obviate the aforementioned problems.

SUMMARY OF THE INVENTION

It is an object of the present invention to provide a method of model adaptation for noisy speech recognition, which is able to perform an adaptation process with a relatively low computation amount, while maintaining a sufficient speech recognition rate.

To achieve the object, the present invention provides a method of model adaptation for noisy speech recognition to determine the cepstral mean vector and covariance matrix of adapted noisy speech from cepstral mean vectors and covariance matrices of speech and noise. The method first transfers the cepstral mean vectors of noise and speech into linear spectral domain, respectively. Then, the method combines the linear spectral mean vectors of noise and speech to obtain a linear spectral mean vector of noisy speech. Next, the method transfers the linear spectral mean vector of noisy speech from linear spectral domain into cepstral domain, so as to determine the cepstral mean vector of adapted noisy speech. Finally, the method multiplies the cepstral covariance matrices of speech and noise by a first and a second scaling factor, respectively, and combines the multiplied cepstral covariance matrices together, so as to determine the cepstral covariance matrix of adapted noisy speech.

The above and other objects, features and advantages of the present invention will become apparent from the following detailed description taken with the accompanying drawings.

DETAILED DESCRIPTION OF THE PREFERRED EMBODIMENTS

Figure 1:
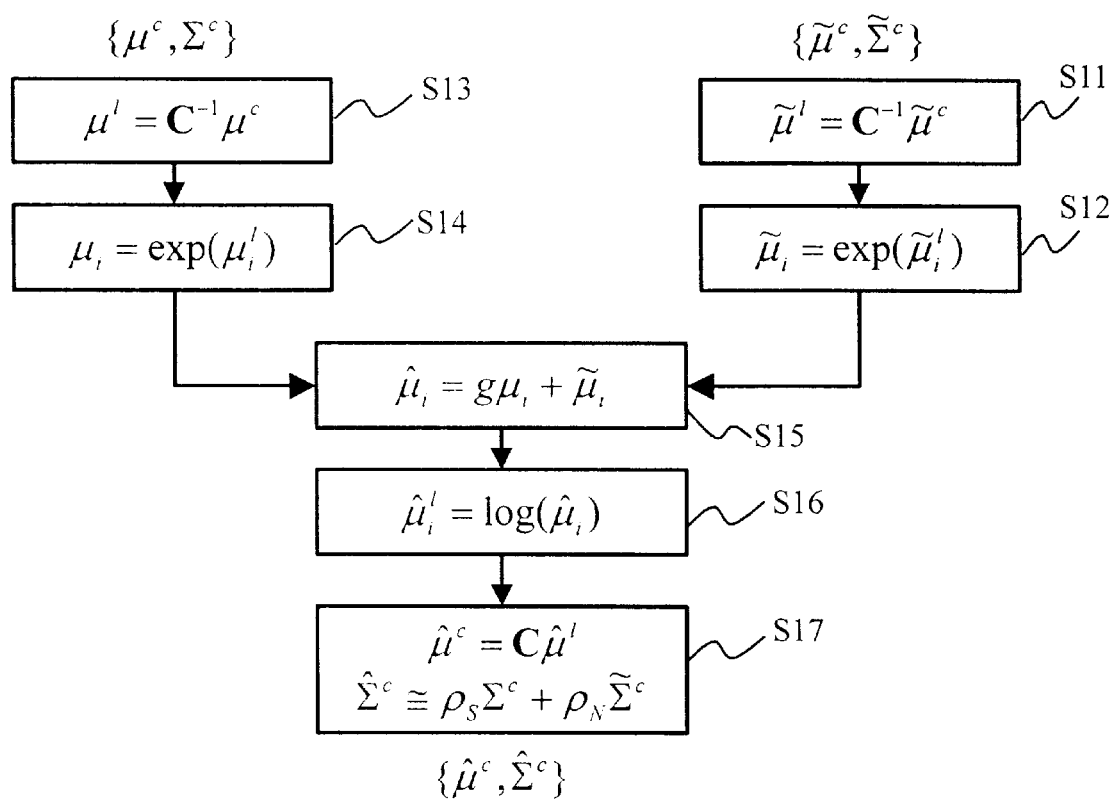
FIG. 1 is a conceptual view illustrating the flow of a noise adaptation process in the method of the present invention.
Figure 2:
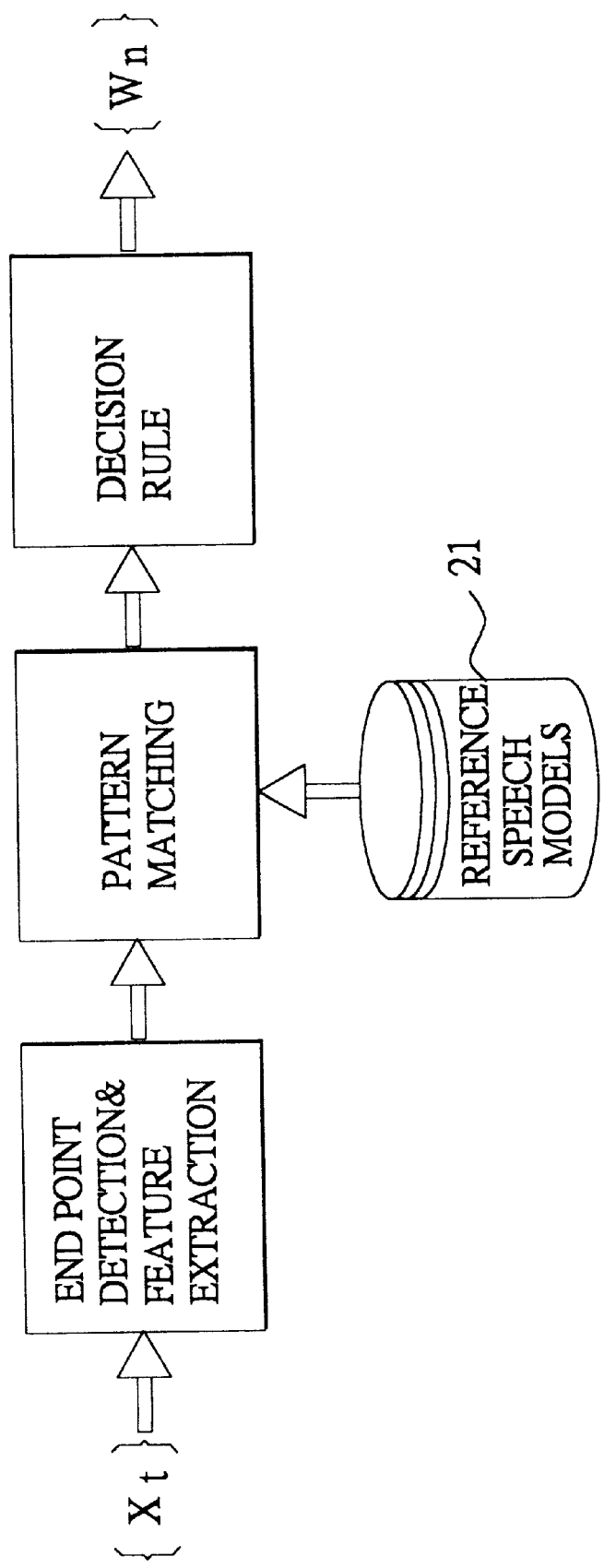
FIG. 2 is a schematic diagram showing a conventional automatic speech recognition system.
Figure 3:
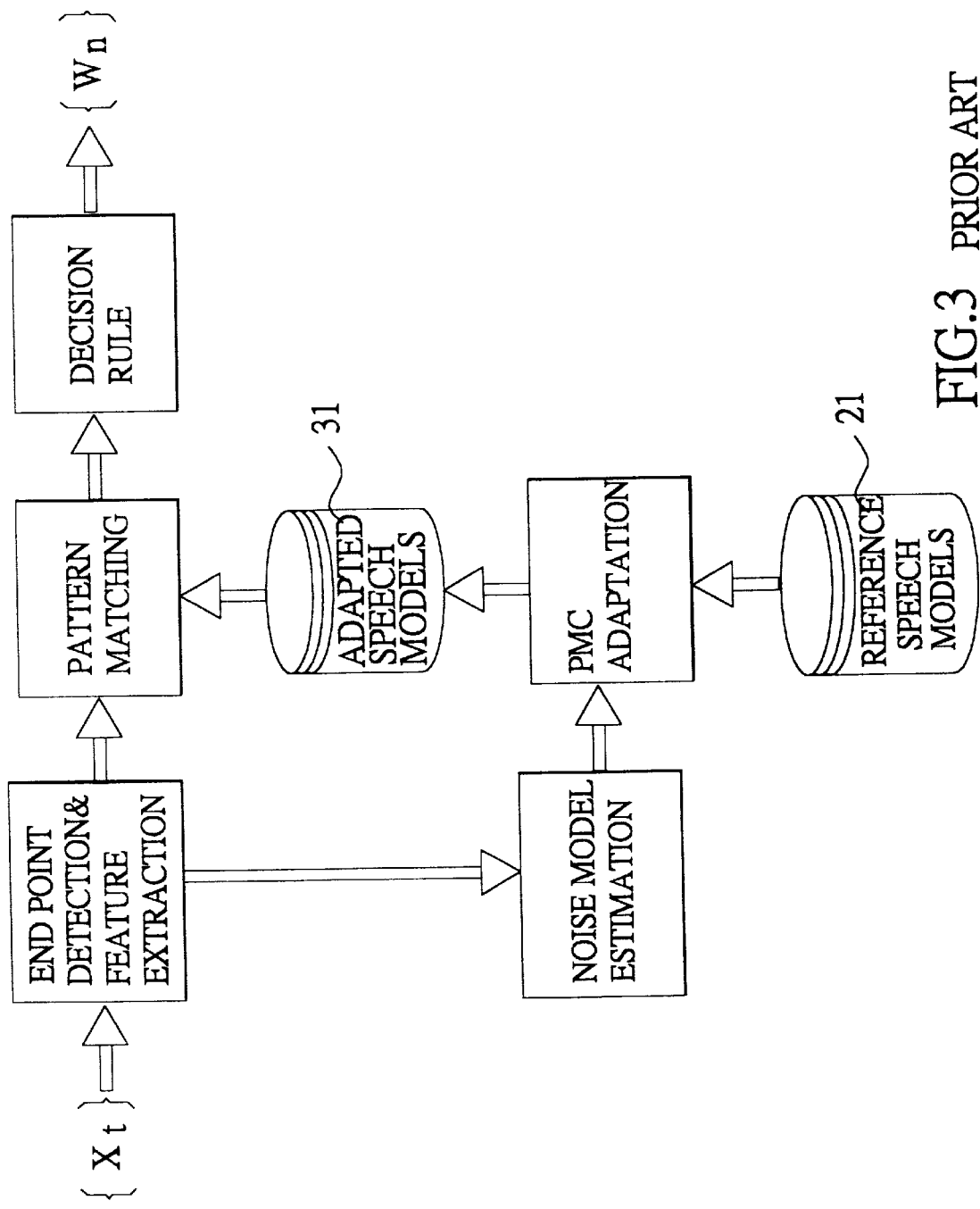
FIG. 3 is a schematic diagram showing a conventional automatic speech recognition system with noise adaptation.

Referring to FIG. 1, there is shown a flowchart of the method of model adaptation for noisy speech recognition in accordance with the present invention. As shown, it is assumed that the cepstral mean vectors and covariance matrices of speech and noise are represented by $\{\mu^c, \Sigma^c\}$ and $\{\mu^c, \Sigma^c\}$, respectively. The method first, in step S11, transfers the cepstral mean vector of noise from cepstral domain into log-spectral domain, i.e., $$\mu^l = C^{-1}\mu^c,$$

where $C^{-1}$ is a matrix for the IDCT having the following components:

$$c_{i,j}^{-1} = \begin{cases} 1/n, & \text{if } j = 0. \\ (2/n)\cos((i+0.5)j\pi/n), & \text{if } j \neq 0 \end{cases},$$

and n is the dimension of the linear spectral mean vector $\mu$. In step S12, each component in the log-spectral mean vector of noise is transferred from log-spectral domain into linear spectral domain by executing an operation of $\mu_i = \exp(\mu_i^l)$.

Similarly, in step S13, the cepstral mean vector of speech is transferred from cepstral domain into log-spectral domain, i.e., $$\mu^l = C^{-1}\mu^c.$$

In step S14, each component in the log-spectral mean vector of speech is transferred from log-spectral domain into linear spectral domain by executing an operation of $\mu_i = \exp(\mu_i^l)$.

After obtaining the mean vectors of speech and noise in linear spectral domain, the corresponding statistic of noisy speech can be determined, in step S15, by performing a parameter combination operation as follows:

$$\hat{\mu}_i = g\mu_i + \mu_i,$$

where g is a scaling factor that provides the power matching between the training data and the test utterance.

In step S16, the above combined mean vector is transferred from linear spectral domain into log-spectral domain, i.e., $$\hat{\mu}_i^l = \log(\hat{\mu}_i).$$

In step S17, the above log-spectral mean vector is transformed by DCT to obtain the cepstral mean vector of adapted noisy speech, i.e., $$\hat{\mu}^c = C\hat{\mu}^l,$$

where C is a matrix for DCT having the following components:

$$c_{i,j} = \begin{cases} 1, & \text{if } i = 0. \\ \cos(i(j+0.5)\pi/n), & \text{if } i \neq 0 \end{cases},$$

and n is the dimension of the linear spectral mean vector $\mu$.

In step S17, the cepstral covariance matrix of adapted noisy speech is obtained from adjusting the covariance matrices of speech and noise in such a manner that the covariance matrices of speech and noise are multiplied by respective scaling factors and then are combined as follows:

$$\hat{\Sigma}^c \approx \rho_S \Sigma^c + \rho_N \Sigma^c,$$

where $P_S$ and $P_N$ are scaling factors, each having a value of smaller than one. The effect of the scaling factors is to adjust the proportions of the covariance matrices of speech and noise included in the cepstral covariance matrix of noisy speech based on the noise to speech ratio. That is, the cepstral covariance matrix of noisy speech can be adjusted to approximate the cepstral covariance matrix of speech when the noise level is low, or the cepstral covariance matrix of noise when the noise level is high, so as to obtain a cepstral covariance matrix in noisy environment.

For illustrative purpose, there are four preferred examples of the scaling factors provided as follows:

1. $\rho_S = a$ and $\rho_N = b$ (denoted as FPMC1 method);
2. $\rho_S = a/a+b$ and $\rho_N = b/a+b$ (denoted as FPMC2 method), where $$a = \frac{1}{n}\sum_{i=0}^{n-1}\left(\frac{g\mu_i}{\hat{\mu}_i}\right)^2, \quad b = \frac{1}{n}\sum_{i=0}^{n-1}\left(\frac{\tilde{\mu}_i}{\hat{\mu}_i}\right)^2,$$

and n is the dimension of the linear spectral mean vector $\mu$;

3. $\begin{cases} \rho_s = 1 \ \& \ \rho_N = 0, & \text{if } r \geq \tau \\ \rho_s = 0 \ \& \ \rho_N = 1, & \text{if } r \leq 1/\tau \\ \rho_s = \rho_N = 0.5, & \text{elsewhere} \end{cases}$ where r is the energy ratio defined by $$r = \sum_{j=0}^{n-1}\mu_j \Big/ \sum_{j=0}^{n-1}\tilde{\mu}_j$$

and $\tau$ is a predefined threshold for the ratio ($\tau$ can be set to 10 for instance);

4.

$$\rho_S = \frac{d_s}{d_s + d_N} \text{ and } \rho_N = \frac{d_N}{d_s + d_N},$$

where $$d_s \overset{Def}{=} \|\mu_j^c - \hat{\mu}_j^c\| = \left(\sum_{j=1}^{p}(\mu_j^c - \hat{\mu}_j^c)^2\right)^{0.5}$$

and $$d_N \overset{Def}{=} \|\tilde{\mu}_j^c - \hat{\mu}_j^c\| = \left(\sum_{j=1}^{p}(\tilde{\mu}_j^c - \hat{\mu}_j^c)^2\right)^{0.5},$$

p is the dimension of truncated epstral vector.

In view of the foregoing, it is appreciated that, in comparison with the conventional PMC method, the method in accordance with the present invention is able to avoid a considerable amount of matrix multiplication because no transformation between cepstral domain and linear spectral domain for the covariance matrix is required. Therefore, the adaptation speed is significantly increased. Furthermore, the scaling factors $\rho_S$ and $\rho_N$ are computed based on the noise to speech ratio, such that the cepstral covariance matrix of adapted noisy speech can approximate the actual cepstral covariance matrix in the noisy environment, thereby achieving a reliable speech recognition.

To verify the advantage of the method in accordance with the present invention, an experiment is performed to compare the speech recognition effects of the conventional methods and the present method by recognizing the names of two groups of people. One speech database employed in the experiment is established by a speech recording of 18 males and 11 females, each pronouncing 120 names. This speech database is divided into two parts, one being used as test utterance and the other being used as training data, and these two parts are alternatively used in the experiment. As such, the total number of test utterance is 3,480. A second speech database is a short-sentence speech database established by a speech recording of 51 males and 50 females, each pronouncing 50 short sentences. This short-sentence speech database is only used as training data. These two speech databases are recorded in a quiet studio through a microphone. In a first recognition test, the noisy speech is formed by artificially adding three noise sources to clean speech based on predetermined signal-to-noise ratios (SNRs). These three noise sources are selected from the well-known NOISEX-92 database, which are of babble, factory, and lynx noises. In a second recognition test, the speech database of the first recognition test is used as the training data, while the test utterance is recorded from another 5 males and 5 females in a car cabin, wherein the microphone is secured in the sun visor and the stereo is turned off. The car is in one of three speeds: 0 km/hr (engine idle), 50 km/hr, and 90 km/hr, for providing three recording conditions. For each recording condition, each person pronounces 20, 30, and 40 names. Accordingly, the recorded SNRs (in dB) of the test utterance based on the driving speeds and speakers are listed in the following Table I:

TABLE I

SNR of noisy data collected in car cabin

| Speaker ID. | SNR (dB) | | |
|---|---|---|---|
| | 0 km/hr | 50 km/hr | 90 km/hr |
| M1 | 11.0 | −4.2 | −2.6 |
| M2 | 15.1 | 1.0 | 0.7 |
| M3 | 5.8 | −6.0 | −10.1 |
| M4 | 7.1 | −3.2 | −6.0 |
| M5 | 8.2 | −8.4 | −9.3 |
| F1 | 5.5 | −3.8 | −3.6 |
| F2 | 6.4 | −7.2 | −4.8 |
| F3 | 5.2 | −3.5 | −9.0 |
| F4 | 0.9 | −6.8 | NA |
| F5 | −2.8 | −8.8 | −8.6 |
| Ave. | 6.2 | −5.1 | −5.9 |

In view of the above Table I, it is known that SNR is usually relatively low in a car cabin, and when the driving speed increases and the noise becomes greater, the SNR gets lower. The test result of the aforementioned first recognition test is listed in Tables II(1)–II(3), and the test result of the second recognition test is listed in Table III.

TABLE II(1)

recognition error rate (in %) of noisy speech (babble)

| Babble | 20 dB | 15 dB | 10 dB | 5 dB |
|---|---|---|---|---|
| No Adapt. | 1.9 | 4.9 | 16.8 | 51.5 |
| PMC | 1.5 | 2.1 | 5.0 | 15.7 |
| FPMC1 | 1.5 | 2.1 | 5.0 | 14.9 |
| FPMC2 | 1.4 | 2.2 | 5.1 | 15.0 |

TABLE II(2)

recognition error rate (in %) of noisy speech (factory)

| Factory | 20 dB | 15 dB | 10 dB | 5 dB |
|---|---|---|---|---|
| No Adapt. | 1.9 | 3.6 | 12.7 | 42.7 |
| PMC | 1.6 | 2.1 | 5.0 | 15.4 |
| FPMC1 | 1.5 | 2.1 | 4.1 | 12.4 |
| FPMC2 | 1.6 | 2.2 | 4.1 | 12.5 |

TABLE II(3)

recognition error rate (in %) of noisy speech (lynx)

| Lynx | 20 dB | 15 dB | 10 dB | 5 dB |
|---|---|---|---|---|
| No Adapt. | 1.7 | 3.3 | 12.4 | 45.9 |
| PMC | 1.6 | 2.2 | 4.3 | 13.8 |
| FPMC1 | 1.5 | 2.0 | 3.7 | 9.2 |
| FPMC2 | 1.5 | 2.0 | 3.7 | 10.1 |

TABLE III recognition error times (rate) of test utterance in car cabin

| Test Condition | Test No. | No Adapt. | PMC | FPMC1 | FPMC2 |
|---|---|---|---|---|---|
| 0 km/hr | 196 | 21 (10.7%) | 4 (2.0%) | 5 (2.6%) | 4 (2.0%) |
| 50 km/hr | 297 | 120 (40.4%) | 28 (9.4%) | 19 (6.4%) | 21 (7.1%) |
| 90 km/hr | 358 | 181 (50.6%) | 60 (16.8%) | 46 (12.9%) | 45 (12.6%) |

In view of the above test results, it is known that the method in accordance with the present invention has almost the same speech recognition rate as the conventional PMC method when the SNR is more than 10 dB, while can be better when the SNR is less than 10 dB. To evaluate the improvement in adaptation speed for the method in accordance with the present invention, the time ratios, in this experiment, needed for adapting 1464 Gaussian densities in using the conventional PMC method and the present FPMC2 method are listed in Table IV. It is appreciated that the method in accordance with the present invention achieves a great improvement in adaptation speed.

While the invention herein disclosed has been described by means of specific embodiments, numerous modifications and variations could be made thereto by those skilled in the art without departing from the scope and spirit of the invention set forth in the claims.

What is claimed is:

1. A method of model adaptation for noisy speech recognition to determine cepstral mean vector and covariance matrix of adapted noisy speech from cepstral mean vectors and covariance matrices of noise and speech, said method comprising the steps of:

transferring said cepstral mean vectors of noise and speech into linear spectral domain to obtain linear spectral mean vectors of noise and speech, respectively;

combining said linear spectral mean vectors of noise and speech to obtain a linear spectral mean vector of noisy speech;

transferring said linear spectral mean vector of noisy speech from linear spectral domain into cepstral domain, so as to determine a cepstral mean vector of adapted noisy speech; and multiplying said cepstral covariance matrices of speech and noise by a first and a second scaling factor, respectively, and combining said multiplied cepstral covariance matrices together, so as to determine a cepstral covariance matrix of adapted noisy speech.

2. The method as claim in claim 1, wherein each of said first and said second scaling factors has a value smaller than one, such that said cepstral covariance matrix of noisy speech is adjusted to selectively approximate to said cepstral covariance matrix of speech and said cepstral covariance matrix of noise based on noise to speech ratio.

3. The method as claim in claim 1, wherein said linear spectral mean vector of noisy speech is obtained by:

$$\hat{\mu}_i = g\mu_i + \mu_i,$$

where $\mu$ represents said linear spectral mean vector of speech, $\mu$ represents said linear spectral mean vector of noise, and g is a scaling factor for power matching.

4. The method as claimed in claim 3, wherein said first scaling factor has a value of $$\frac{1}{n}\sum_{i=0}^{n-1}\left(\frac{g\mu_i}{\hat{\mu}_i}\right)^2,$$

and said second scaling factor has a value of $$\frac{1}{n}\sum_{i=0}^{n-1}\left(\frac{\tilde{\mu}_i}{\hat{\mu}_i}\right)^2,$$

where n is the dimension of said linear spectral mean vector of speech.

5. The method as claimed in claim 3, wherein said first scaling factor has a value of $$\frac{a}{a+b},$$

and said second scaling factor has a value of $$\frac{b}{a+b},$$

where $$a = \frac{1}{n}\sum_{i=0}^{n-1}\left(\frac{g\mu_i}{\hat{\mu}_i}\right)^2, \quad b = \frac{1}{n}\sum_{i=0}^{n-1}\left(\frac{\tilde{\mu}_i}{\hat{\mu}_i}\right)^2,$$

and n is the dimension of said linear spectral mean vector of speech.

6. The method as claimed in claim 2, wherein said first and said second scaling factors have values determined by:

$$\begin{cases} \rho_s = 1 \ \& \ \rho_N = 0, & \text{if } r \geq \tau \\ \rho_s = 0 \ \& \ \rho_N = 1, & \text{if } r \leq 1/\tau, \\ \rho_s = \rho_N = 0.5, & \text{elsewhere} \end{cases}$$

where $\rho_S$ and $\rho_N$ represent said first and said second scaling factors, respectively, r is an energy ratio defined by $$r = \sum_{j=0}^{n-1} \mu_j \bigg/ \sum_{j=0}^{n-1} \tilde{\mu}_j,$$

$\tau$ is a predefined threshold for said energy ratio, $\mu$ represents said linear spectral mean vector of speech, $\mu$ represents said linear spectral mean vector of noise, and n is the dimension of said linear spectral mean vector of speech.

7. The method as claimed in claim 2, wherein said first scaling factor has a value of $$\frac{d_N}{d_s + d_N},$$

and said second scaling factor has a value of $$\frac{d_N}{d_s + d_N},$$

where $$d_s \stackrel{Def}{=} \|\mu_j^c - \hat{\mu}_j^c\| = \left(\sum_{j=1}^{p} (\mu_j^c - \hat{\mu}_j^c)^2\right)^{0.5},$$

$$d_N \stackrel{Def}{=} \|\tilde{\mu}_j^c - \hat{\mu}_j^c\| = \left(\sum_{j=1}^{p} (\tilde{\mu}_j^c - \hat{\mu}_j^c)^2\right)^{0.5},$$

$\mu^c$ represents said cepstral mean vector of speech, $\hat{\mu}^c$ represents said cepstral mean vector of noisy speech, and $\tilde{\mu}^c$ represents said cepstral mean vector of noise.

8. The method as claimed in claim 1, wherein said cepstral mean vectors of noise and speech are first transferred into log-spectral domain and then transferred into linear spectral domain.

9. The method as claimed in claim 8, wherein said cepstral mean vectors of noise and speech are transferred from cepstral domain into log-spectral domain by inverse discrete cosine transformation.

10. The method as claimed in claim 1, wherein said linear spectral mean vector of noisy speech is first transferred into log-spectral domain and then transferred into cepstral domain.

11. The method as claimed in claim 10, wherein said log-spectral mean vector of noisy speech is transferred into cepstral domain by discrete cosine transformation.

* * * * *